United States Patent [19]
Binns et al.

[11] Patent Number: 5,620,801
[45] Date of Patent: Apr. 15, 1997

[54] THERMOSETTING POLYESTER RESIN

[75] Inventors: Malcolm R. Binns, Austinmer; Jim Viatos, Lugarno; Jenny A. Maliphant, Mount Warrigal, all of Australia

[73] Assignee: BHP Steel (JLA) Pty. Ltd., Melbourne, Australia

[21] Appl. No.: 481,509

[22] PCT Filed: Dec. 21, 1994

[86] PCT No.: PCT/AU94/00783

§ 371 Date: Jul. 20, 1995

§ 102(e) Date: Jul. 20, 1995

[87] PCT Pub. No.: WO95/18171

PCT Pub. Date: Jun. 7, 1995

[30] Foreign Application Priority Data

Dec. 24, 1993 [AU] Australia ................... PM3161

[51] Int. Cl.$^6$ ............... B32B 27/36; C08F 20/00
[52] U.S. Cl. ............... 428/482; 528/272; 528/274; 528/296; 528/300; 528/302; 528/308; 528/308.6; 525/437; 525/440; 525/441; 524/81; 524/413; 524/539; 428/458
[58] Field of Search ................... 528/272, 274, 528/296, 300, 302, 308, 308.6; 525/437, 440, 441; 524/81, 413, 539; 428/458, 482

[56] References Cited

FOREIGN PATENT DOCUMENTS

| 282239 | 1/1966 | Australia . |
| 26398/92 | 5/1993 | Australia . |
| 63-258672 | 10/1988 | Japan . |
| 1-315472 | 12/1989 | Japan . |
| 4036363 | 2/1992 | Japan . |

OTHER PUBLICATIONS

Derwent Abstract Accession No. 80–304980/42.
Derwent Abstract Accession No. 88–348835/49
Patent Abstract of Japan, C–279, p. 60, JP,A, 59–230022.
Patent Abstract of Japan, C–248, p. 44, JP,A, 59–113026.

*Primary Examiner*—Samuel A. Acquah
*Attorney, Agent, or Firm*—Nikaido, Marmelstein, Murray & Oram LLP

[57] ABSTRACT

The present invention relates to a polyester resin for use in a thermosetting coating composition, said polyester comprising an acid component, an alcohol component and a trifunctional branching agent; wherein the acid component consists of from 90 to 100 mole % of an aromatic acid or aromatic anhydride or mixture thereof and from 0 to 10 mole % of a polycarboxylic acid or polycarboxylic anhydride or mixture thereof; and wherein the alcohol component consists of at least 60 mole % of one or more glycols selected from the group consisting of $CH_3-CH_2-C(CH_2OH)_2-R_1$ wherein $R_1$ is an alkyl and derivatives of said glycols, from 0 to 20 mole % of neopentylglycol, and of up to 20 mole % of a trifunctional branching agent.

23 Claims, No Drawings

THERMOSETTING POLYESTER RESIN

This Application is 371 of PCT/AU94/00783 filed Dec. 21, 1994.

1. Field of the Invention

The present invention relates to a thermosetting coating composition and more particularly to a crosslinkable polyester resin suitable for coating metal sheets and coils.

2. Background of the Invention

Desirably, coating compositions for metal sheets and coils should be resistant to sunlight, UV radiation, hydrolysis, adverse weather conditions, solvents and should also display good gloss and hardness retention and rapid cure.

The requirements for resistance to colour change and for good gloss retention when exposed to weather are difficult to satisfy and present a particular problem because data obtained by means of a UV-A accelerated weatherometer does not correlate well with data from a UV-B accelerometer and both correlate poorly with actual weather exposure. Sample resins which "pass" in the weatherometer sometimes "fail" on exposure to weather and sample resins which fail in the weatherometer are frequently rejected without further testing.

Thermosetting coatings are generally used as decorative coatings for metal sheet coils. These coatings are typically produced by reacting at elevated temperatures a blend of hydroxyfunctional resin and a crosslinking agent such as a derivative of melamine formaldehyde, benzoguanamine formaldehyde, glycouril formaldehyde, urea formaldehyde or a blocked isocyanate resin. Hydroxyfunctional resins such as polyester, acrylic and alkyd are generally used as the major component of the decorative coatings and of those resins, polyesters are preferred.

Hydroxyfunctional polyester resins are generally manufactured by reacting glycols with a mixture of dicarboxylic acid components together with a trifunctional branching component to form a branched polyester. The mixture of dicarboxylic acid components comprises an aromatic dicarboxylic acid and an aliphatic dicarboxylic acid component. The aromatic dicarboxylic acid component may be, for example, orthophthalic acid, terephthalic acid and/or a corresponding anhydride and the aliphatic dicarboxylic acid component may, for example, be sebacic or succinic acid. At least 20 mole % and as much as 80 mole % of the total acid component is an aliphatic dicarboxylic acid which is employed to prevent crystallization of the product due to inherent crystallinity of aromatic acids and because aliphatic systems tend to be less UV absorbing.

Although many such resins are known there remains a need for resins for use in coating compositions with improved gloss retention, and resistance to colour change on extensive exposure and which are suitable for coating onto metal coil. The latter entails the ability to be applied uniformly in a film thickness of 15 to 25 microns, a capacity for rapid thermal film cure, satisfactory film durability, flexibility, hardness, peel resistance, impact shock resistance and the like.

Object of the Invention

Accordingly, it is an object of the present invention to provide an improved thermosetting coating composition for metal sheets and coils.

SUMMARY OF THE INVENTION

According to one aspect, the invention consists in a polyester for use in a thermosetting coating composition, said polyester comprising an acid component, an alcohol component and a trifunctional branching agent; wherein the acid component consists of from 90 to 100 mole % of an aromatic acid or aromatic anhydride or mixture thereof and from 0 to 10 mole % of a polycarboxylic acid or polycarboxylic anhydride or mixture thereof; and wherein the alcohol component consists of at least 60 mole % of one or more glycols selected from the group consisting of $CH_3$—$CH_2$—$C(CH_2OH)_2$—$R_1$ wherein $R_1$ is an alkyl and derivatives of said glycols, from 0 to 20 mole % of neopentylglycol, and of up to 20 mole % of a trifunctional branching agent.

For preference $R_1$ is methyl, ethyl or butyl. Desirably, the glycol comprises at least 80 mole % of the total acid component.

According to a second aspect the invention consists in a thermosetting coating composition comprising a resin according to the first aspect of the invention and a crosslinking agent.

In a preferred embodiment the crosslinking agent is selected from the groups consisting of a derivative of melamine formaldehyde, benzoguanamine formaldehyde, glycouril formaldehyde, urea formaldehyde and a blocked isocyanate resin.

In a highly preferred embodiment the aromatic acid is isophthalic acid (IPA) but other aromatic acids such as terephthalic acid and orthophthalic acid and the corresponding anhydrides may also be used. For preference, polycarboxylic acids or polycarboxylic anhydrides such as trimellitic acid, adipic acid (AA), succinic acid, azelaic acid and sebacic acid and the corresponding anhydrides can be used in the present invention.

DESCRIPTION OF PREFERRED EMBODIMENTS

The present invention will now be more particularly described, by way of example only, with reference to various examples.

Generally, the acid component of the composition according to the present invention consists of 90 to 100 mole % of isophthalic acid and preferably from 95 to 100 mole % (based on the weight of the total acid component). The acid or anhydride component may also be substituted with one or more groups such as methyl, ethyl, butyl, propyl etc. However, groups that are prone to hydrolysis are generally not used as this makes the resulting coating composition more resistant to exterior exposure.

2-Butyl-2-ethyl-1,3-propanediol (BEPD) ($R_1$=butyl) is the preferred glycol of the present invention as its esters do not readily hydrolyse, however other glycols such as when $R_1$ is ethyl and neopentylglycol hydroxy pivalate (HPHP) may also be used as the glycol component. In a preferred embodiment from about 0 to 10 mole % of neopentylglycol (NPG) is used together with BEPD or neopentylglycol hydroxy pivalate and isophthalic acid. The glycols may also be derivatives that are generally resistant to hydrolysis. In particular they may be derivatives which contain carbon atoms beta to the hydroxyl substituents that are dialkylated where the dialkylated groups include but are not limited to methyl, ethyl, propyl, butyl etc.

The acid component and glycol component are mixed with suitable branching agents to provide the desired polyester composition. Useful polyester trifunctional branching agents include trimethylolpropane and trimethylolethane. Typically the trifunctional branching agent is present in an amount of from 0 to 20 mole % and more preferably from 5 to 15 mole % based on the total alcohol content.

Coating compositions based on the hydroxyfunctional polyesters of the present invention display good gloss retention and resistance to colour change after three years exterior exposure when compared with the prior art hydroxyfunctional polyesters. This finding was not predictable as a result of accelerated testing with a QUV Accelerated Weather Performance Test using standard QUVB-313 ultraviolet lamps from the Q-panel company.

The polyester resin generally has an acid value of from 0 to 10, a hydroxyl value of 20 to 110 and a number average molecular weight of from 700 to 8000.

Solvents, pigments, dispersants and catalysts can optionally be added to the thermosetting polyester resin and processed by conventional methods of manufacture to form a durable surface coating. Surprisingly, it has also been found that the polyester resins of the present invention are soluble in pure aromatic solvents whereas the prior art polyester resins with high aromatic content are not. Suitable pigments of the present invention include, but are not limited to, titanium dioxide, ultramarine blue, phthalocyanine blue, phthalocyanine green, carbon black, black iron oxide, chromium green oxide, ferrite yellow and quindo red.

The thermosetting coating composition may also contain other additives that are typically incorporated into coating compositions such as degassing agents, flow control agents and anti-oxidants.

The thermosetting coating composition displays excellent gloss and hardness retention compared with controls in alkaline and humid environments. The coating composition is suitable for coating metal coils as a topcoat of precoated metal for electric appliances eg, washing machines and dishwashers which are required to have high processability and resistance to alkalis and humidity.

Coatings based on these resins display high initial gloss levels when appropriately formulated.

Various embodiments of the invention will now be exemplified.

Polyester I: 1.66 mol. of isophthalic acid, 1.61 mol of 2-butyl-2-ethyl-1,3-propanediol (BEPD) and 0.19 mol of trimethylolpropane were mixed together in a reaction vessel equipped with a nitrogen purge, a stirrer, a thermometer, fractionating column and a water take-off condenser. The reactants were heated up to a temperature of 240° C. at a rate to maintain the column head temperature at less than 102° C. Once the resin melt had cleared and the water removal rate slowed, the fractionating column and water take-off condenser were replaced by a Dean-Stark apparatus. Sufficient xylene was then added to maintain condensation of xylene in the Dean-Stark apparatus and removal of water until the resin achieved an acid value of 6.2.

The polyester was dissolved in Solvesso 150 (Solvent blend I) to give polyester solution (I) with solid component 60%.

Polyester II: 1.43 mol of isophthalic acid, 0.13 mole of adipic acid, 1.13 mol BEPD, 0.56 mol neopentylglycol hydroxy pivalate and 0.18 mol of trimethylolpropane was processed as above to an acid value of 4.

The polyester was dissolved in a 10:20:70 (by weight) mixture of butanol, Ektapro EEP, Solvesso 150 respectively (solvent blend II) to give a solid component 60%.

Polyester III: A polyester resin comprised of 1.40 mol isophthalic acid, 0.13 mol trimellitic anhydride, 1.36 mol BEPD, 0.29 mol neopentylglycol hydroxy pivalate, 0.18 neopentylglycol and 0.5 g Fascat 4100 was processed as above to an acid value of 3.

The polyester was dissolved in a 10:20:70 (by weight) mixture of butanol, Ektapro EEP, Solvesso 150 respectively (solvent blend II) to give a solid component 60%.

METHOD OF MANUFACTURE OF PAINT 1

A paint suitable for coil coating was produced by the following procedure. 56.8 parts of coloured pigment, 4.9 parts of titanium dioxide and 1.2 parts of Aerosil 972 were dispersed in a mixture of 6.2 parts of a butylated melamine formaldehyde resin (Cymel 1156) (98% solids) and 31 parts of solvent blend (I). 28.5 parts of the above millbase were combined with 5.6 parts butylated melamine formaldehyde, 47.6 parts of polyester (I) solution, 0.24 parts blocked organic sulphonic acid catalyst, 0.2 parts flow additive (Byk 306), 3 parts silica (Syloid ED5) and sufficient solvent to give a package viscosity of 96s (Ford 4 cup) at 25° C.

PAINT 2: 56.8 parts of coloured pigment, 4.9 parts of titanium dioxide and 1.2 parts of Aerosil 972 were dispersed in a mixture of 6.2 part polyester II solution and 31 parts solvent blend (II) to produce a pigmented millbase (II). 28.5 parts of millbase (II) was combined with 51.76 parts of polyester solution (II), 3.59 parts of methylated melamine formaldehyde resin (Cymel 303), 0.15 parts of blocked organic sulphonic acid catalyst, 0.2 parts flow additive (Byk 306), 3 parts silica and sufficient solvent to give a package viscosity of 96s (Ford 4 cup) at 25° C.

PAINT 3: Paint 3 was prepared as described for paint 1 with polyester 3 substituted for polyester 1 and solvent blend II substituted for solvent blend I.

PAINT 4: 28.5 parts of millbase II as described above was combined with 51.76 parts of polyester solution (II), 4.48 parts of blocked isocyanate resin (Coronate 2515) (80% solids), 0.8 parts dibutyltin dilaurate, 0.2 parts flow additive 3 parts silica and sufficient solvent to give a package viscosity of 96s (Ford 4 cup) at 25° C.

In Table 1, Examples 1 to 4, 6 to 9, 11 to 13 and 16 are prior art resins while Examples 5, 10, 14 and 15 are resins according to the invention. All the resins are processed by conventional methods of manufacture into a paint composition and the results of gloss retention and other tests are presented in the Table.

The following materials referred to in this specification were obtained a from the suppliers indicated below:

| Material | Supplier |
| --- | --- |
| Pigment Mix 329 | Shepherd |
| Aerosil R972 | Degussa |
| Cymel 1156 | Cyanamid |
| Cymel 303 | Cyanamid |
| Solvesso 150 | Exxon |
| Cycate 600 | Cyanamid |
| Coronate 2515 | — |
| DMEA | Aldrich |
| Byk 306 | Byk-Chemie |
| Syloid ED-5 | W. R. Grace |

Although the invention has been described with reference to specific embodiments, it will be appreciated by those skilled in the art, that the invention may be embodied in many other forms.

TABLE 1

DURABILITY TESTING DIFFERENT POLYESTER COMPOSITIONS WHEN MADE UP INTO WEATHERED COPPER PIGMENTED PAINTS

| Example | 1 | 2 | 3 | 4 | 5 | 6 | 7 |
|---|---|---|---|---|---|---|---|
| Diacid(s) | 1,4 CHDA[3] (97%) | 1,4 CHDA (97%) | 1,4 CHDA (97%) | 1,4 CHDA (97%) | IPA | 1,4 CHDA (97%) | 1,3 CHDA[4] (99+) |
| Diol(s) | BEPD | NPG | HPHP | 1,4 CHDM[5] | BEPD | TMPD[6] | 1,4 CHDM |
| Processability[8] | Yes | No | No | No | Yes | Yes | Yes |
| UVB ΔE Results (200 light hours) Gloss retention | | | | | 3.14 27 | | 0.66 100 |
| UVA ΔE Results (2000 light hours) Gloss retention | 1.72 13 | 3.34 7 | 4.01 8 | 2.38 25 | 0.58 100 | 4.18 15 | 1.65 50 |
| Rockhampton ΔE Gloss retention (3 years or 1 year where asterisk exists*) | 7.13 6 | 6.37 7 | 7.64 0 | 5.01 13 | 0.42 63 | 5.73 8 | 4.44 13 |

| Example | 8 | 9 | 10 | 11 | 12 | 13 | 14 | 15 | 16 |
|---|---|---|---|---|---|---|---|---|---|
| Diacid(s) | 1,3 CHDA (99+) | AA | IPA | AA | AA | IPA[2] | IPA AA | IPA | Polyester |
| Diol(s) | BEPD | BEPD | HPHP | NPG | HPHP | NPG[2] | BEPD HPHP, | BEPD[7] HPHP, NPG, | Resin |
| Processability[8] | Yes | Yes | Yes | Yes | Yes | No | Yes | Yes | Yes |
| UVB ΔE Results (200 light hours) Gloss retention | 1.81 38 | | 1.99 83 | 1 | | | 2.08 36 | 4.33 6 | 2.34 65 |
| UVA ΔE Results (2000 light hours) Gloss retention | 1.28 13 | 4.74 4 | 0.83 78 | 5.16 7 | 6.91 4 | | — — | — — | 1.95 30 |
| Rockhampton ΔE Gloss retention (3 years or 1 year where asterisk exists*) | 6.21 6 | 2.67* 4* | 0.74 35 | 4.89* 7* | 4.15* 4* | — | — — | — — | 1.68 9 |

[1] All of the above polyesters, except Example 15, also contained a triol TMP in sufficient quantities to give in each case a functionality/molecule of 3.0. Other target resin parameters were MW = 2250; Hydroxyl value = 60; acid value < 10. Millbase pigment mix comprised of Shepherd pigment mix 329 16.2 parts and titanium dioxide 1.4 parts.
[2] The polyester isophthalic acid/neopentylglycol was so crystallized that uniform pigmented films could not be prepared for exposure panel preparations.
[3] 1,4-cyclohexanedicarboxylic acid
[4] 1,3-cyclohexanedicarboxylic acid
[5] 1,4-cyclohexanedimethanol
[6] 2,2,4-trimethyl-1,3-pentanediol
[7] This polyester also contained trimellitic anhydride monomer.
[8] A processable resin is defined as one that does not crystallize within 7 days when diluted to 60% solids in Solvesso 150.
[9] All the paints in this table were made up by using melamine-formaldehyde type crosslinkers.

We claim:

1. A polyester resin for use in a thermosetting metal-coating composition and providing good gloss retention and resistance to color change after three years exterior exposure, said polyester resin comprising units derived by polymerizing:

(a) an acid component comprising from 90 to 100 mole % of an aromatic acid, aromatic anhydride, or mixture thereof, and from 0 to 10 mole % of a polycarboxylic acid, polycarboxylic anhydride thereof, or mixture thereof;

(b) an alcohol component comprising at least 60 mole % of one or more glycols selected from the group consisting of neopentylglycol hydroxy pivalate, $CH_3$—$CH_2$—$C(CH_2OH)_2$—R wherein $R_1$ is a $C_1$–$C_4$ alkyl, neopentylglycol, and mixtures thereof, with the proviso that neopentylglycol is present in an amount of no more than 20 mole % of the total alcohol component; and (c) a polyol trifunctional branching agent present in an amount of from 10 to 20 mole % of the total alcohol component.

2. A polyester resin according to claim 1, wherein $R_1$ is methyl, ethyl or butyl.

3. A polyester resin according to claim 1, wherein said glycol comprises at least 80 mole % of the total alcohol component.

4. A polyester resin according to claim 1, wherein the aromatic acid is selected from the group consisting of isophthalic acid (IPA), terephthalic acid, orthophthalic acid and the corresponding anhydrides thereof.

5. A polyester resin according to claim 4, wherein the aromatic acid is isophthalic acid in an amount of 90 to 100 mole % based on the total weight of the total acid component.

6. A polyester resin according to claim 4 wherein the aromatic acid is isophthalic acid in an amount of 95 to 100 mole % based on the total weight of the total acid component.

7. A polyester resin according to claim 1, wherein the polycarboxylic acids or polycarboxylic anhydrides thereof are selected from the group consisting of trimellitic acid, adipic acid (AA), succinic acid, azelaic acid, sebacic acid and the corresponding anhydrides thereof.

8. A polyester resin according to claim 1, wherein the aromatic acid of (a) is substituted with at least one substituent selected from the group consisting of methyl, ethyl, butyl and propyl groups.

9. A polyester rein according to claim 1, wherein the glycol is 2-butyl-2-ethyl-1,3-propanediol (BEPD) or neopentylglycol hydroxy pivalate (HPHP), or a mixture thereof.

10. A polyester resin according to claim 9, wherein the glycol is 2-butyl-2-ethyl-1,3-propanediol (BEPD).

11. A polyester resin according to claim 9, wherein the glycol is neopentylglycol hydroxy pivalate (HPHP).

12. A polyester resin according to claim 1, wherein the trifunctional branching agent is either trimethylolpropane or trimethylolethane.

13. A polyester resin according to claim 1, further comprising at least one additional additive selected from the group consisting of solvents, pigments, dispersant and catalysts.

14. A polyester resin according to claim 13, wherein the pigments are selected from the group consisting of titanium dioxide, ultramarine blue, phthalocyanine blue, phthalocyanine green, carbon black, black iron oxide, chromium green oxide, ferrite yellow and quindo red.

15. A polyester resin according to claim 1, having an acid value of from 0 to 10, a hydroxyl value of 20 to 110 and a number average molecular weight of from 700 to 8000.

16. A method of preparing a polyester resin according to claim 1, comprising combining said acid component, said alcohol component and said polyol trifunctional branching agent to produce a mixture, and heating the mixture to a temperature at which polymerization occurs.

17. A method according to claim 16, wherein from 0 to 10 mole % of neopentylglycol is combined with (1) BEPD or neopentylglycol hydroxy pivalate, (2) isophthalic acid and (3) a trifunctional branching agent.

18. A method according to claim 16, wherein the trifunctional branching agent is trimethylolpropane or trimethylolethane.

19. A thermosetting coating composition comprising a polyester resin according to claim 1 and a crosslinking agent.

20. A thermosetting coating composition according to claim 19, wherein the crosslinking agent is selected from the group consisting of melamine formaldehyde, benzoguanamine formaldehyde, glycouril formaldehyde, urea formaldehyde and a blocked isocyanate resin.

21. A method of preparing a thermosetting coating composition, comprising combining a polyester resin according to claim 1 and a crosslinking agent to produce a mixture, and heating the mixture.

22. A method according to claim 21, wherein the crosslinking agent is selected from the group consisting of melamine formaldehyde, benzoguanamine formaldehyde, glycouril formaldehyde, urea formaldehyde and a blocked isocyanate resin.

23. Sheet metal, coated with a thermosetting coating composition according to claim 19.

* * * * *